United States Patent [19]
Middel

[11] 4,127,851
[45] Nov. 28, 1978

[54] DEVICE FOR DISPLAYING CHARACTERS

[75] Inventor: Andreas P. Middel, Eindhoven, Netherlands

[73] Assignee: U.S. Philips Corporation, New York, N.Y.

[21] Appl. No.: 791,610

[22] Filed: Apr. 27, 1977

Related U.S. Application Data

[63] Continuation-in-part of Ser. No. 609,450, Sep. 2, 1975, abandoned.

[51] Int. Cl.² .............................................. G06K 15/20
[52] U.S. Cl. ................................ 340/324 AD; 364/521
[58] Field of Search ................ 340/324 AD; 364/200, 364/900, 521

[56] References Cited

U.S. PATENT DOCUMENTS

| | | | |
|---|---|---|---|
| 3,735,384 | 5/1973 | Nussbaum et al. | 340/324 AD |
| 3,760,405 | 9/1973 | Ishii et al. | 340/324 AD |
| 3,818,482 | 6/1974 | Yoshida et al. | 340/324 AD |

Primary Examiner—David L. Trafton
Attorney, Agent, or Firm—Frank R. Trifari; Daniel R. McGlynn

[57] ABSTRACT

A device for displaying a number of lines of characters which are separated from each other by spacing lines on a television tube, comprising a circulating store for one line of characters which is connected to the output of a buffer store for the information of the entire image. An output of the circulating store is fed back to an input of the buffer store. The insertion and deletion of characters is effected by shifting the information between buffer store and circulating store over one or more character positions. Under the control of the correspondence signals from x, y cursor device, the input of the buffer store is then switched over from its own output to the output of the circulating store, with the result that the information in the buffer store is shifted. A vacant position thus produced is available for a new character.

4 Claims, 4 Drawing Figures

DEVICE FOR DISPLAYING CHARACTERS

This is a continuation-in-part of Application Ser. No. 609,450, filed Sept. 2, 1975, now abandoned.

The invention relates to a device for displaying a number of rows of characters which are separated from each other by spacing lines on a CRT display. The invention comprises a circulating store for a line of characters which circulates synchronously with the scanning of a television line of a row of characters, a character generator connected thereto and which is also connected to a signal input of the CRT, and a circulating buffer store for at least the other rows of characters to be displayed. Means are provided for transferring the information of a row of characters from the buffer store to the circulating store during the display of at least one spacing line on the CRT. The device furthermore comprises a clock pulse generator, an input terminal for new character information to be inserted, and a control unit for controlling a relative shift of the image of a portion of a line of characters on the CRT for the uninterrupted display of successive characters of the line. A device of this kind is known from the previous Netherlands Patent Application No. 7,013,593 in the name of Applicant U.S. Pat. No. 3,735,384, incorporated herein by reference). The shifting of a portion of a line of characters is effected in that the circulating store comprises, as is shown in FIG. 7 of the reference, three outputs which are each time separated from each other by separate elements in which the information of a single character can be stored. In accordance with the last paragraph of the reference patent, the capacity of the buffer store can also be line-wise increased each time by one character. However, it is a drawback that in this manner additional outputs are required. Notably when use is made of integrated circuit components, a minimum number of connections is desired.

The present invention has for its object to achieve comparatively simple control. The drawbacks of the prior art are eliminated according to the present invention by connecting an output of the circulating store to an input of the buffer store, so that it is possible to activate the input selectively under the control of a corresponding signal from an $x, y$ cursor device in order to allow passage of a row portion. The row portion is shifted over at least one character position with respect to the information in the buffer store under the control of a changed clock pulse sequence of the clock pulse generator, from the circulating store, constructed as a shift register, to the buffer store. In the prior art device, however, the input consists of a logic OR-gate. The invention also dispenses with the separate elements each time required for a character. The entire circulating store can be composed of a single integrated shift register. The cursor device is known per se, but because the input of the buffer store can be selectively controlled (instead of the input of the circulating store as before), a simplification is achieved. It is known to use the buffer store at a comparatively low operating frequency in order to realize a better protection against disturbances or a lower energy consumption, depending on the technique used. This also means that the input device can operate at a lower frequency, so that it can be less expensive, which is typically true of comparatively slowly operating electronic devices.

The buffer store preferably has a capacity which is adequate for all characters to be displayed. The output of the buffer store is connected, together with the input terminal and the output of the circulating store, via a multiplex device, to the input of the buffer store. It is also possible to switch over the multiplex device under the control of the correspondence signal. Such a multiplex device which is known per se can selectively forward each of the information signals present on an input thereof. In this manner, the input device can be constructed to be very slow. By applying one or more clock pulses too few or too many to the circulating store, a shift between a line of characters stored therein and the corresponding line of characters stored in the buffer store can be very simply realized. The shifting of information is realized by switching over the multiplex device.

The buffer store is preferably also constructed as a shift register. The tolerance between the passage of the various signals is then small and the synchronization is capable of withstanding a variety of disturbing influences.

The invention will be described in detail hereinafter with reference to a number of Figures.

Figure 1:
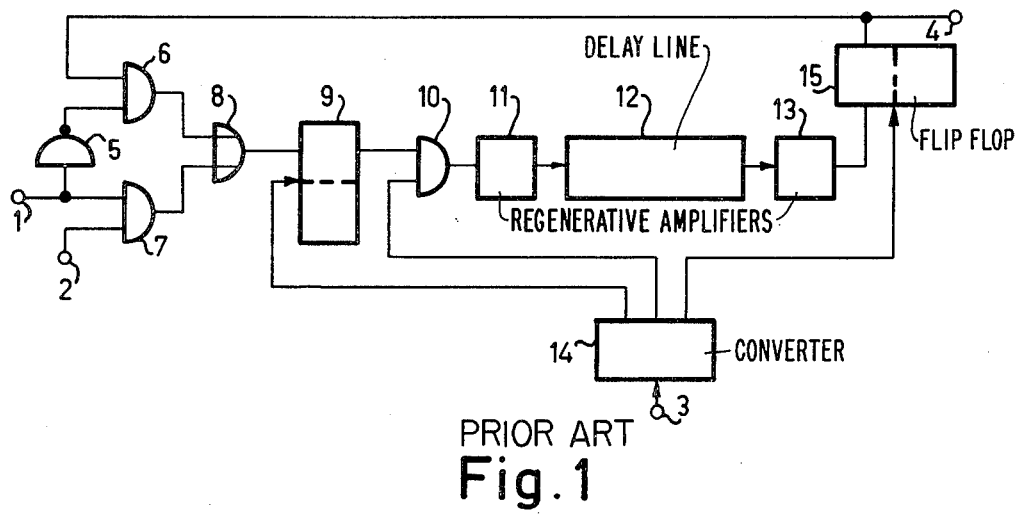
FIG. 1 shows a block diagram of a storage module according to the present state of the art.

FIG. 1 shows a block diagram of a storage module according to the present state of the art. The information is inputed via line 2 and outputed via terminal 4. A logic "1"-signal on the control terminal 1 can unblock the logic AND-gate 7; a logic 0-signal unblocks, via inverter 5, the logic AND-gate 6. On terminal 3 clock pulses can be received whose frequency is adapted to the transmission properties of the delay line 12. The converter 14 adapts the clock pulses to the input and output flipflops 8, 15 and the modulator 10 used. In this example the modulator is an AND-gate whereby information can be deleted by amplitude modulation. The elements 11 and 13 are regenerative amplifiers. The circulating store can be constructed as shown in FIG. 1, as can the buffer store. In the latter case, the capacity of the line 12 must be sufficient to accomodate a plurality of lines of information. In the case of excessive length, the line 12 can be subdivided. Each portion thereof can also be provided with additional regenerative members. The portions can alternatively be constructed as a parallel circuit.

Figure 2:
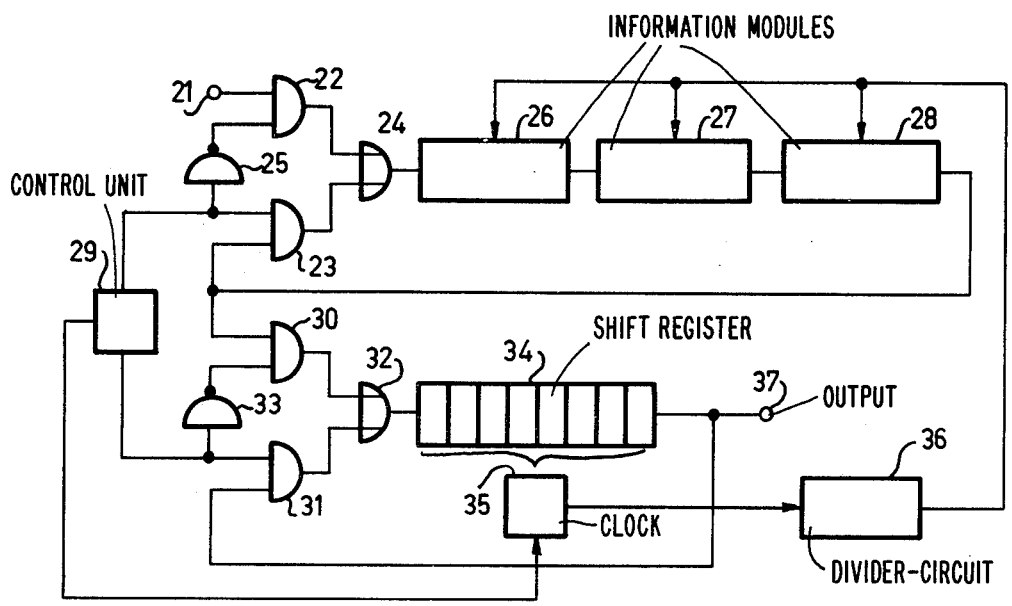
FIG. 2 shows a prior art block diagram of a combination of a circulating store and a buffer store.

FIG. 2 shows a block diagram of a combination of a circulating store and a buffer store, based on FIG. 2 of U.S. Pat. No. 3,735,384. In this example the buffer store consists of three series-connected modules as shown in FIG. 1 (26, 27, 28) which receive part of the pulses from the clock 35 via a divider circuit 36. The clock 35 directly drives the shift register 34, with the result that on the circuit 37 thereof the information of the character to be displayed at this instant appears in synchronism with the scan of the electron beam in the CRT. Output 37 should, therefore, be connected to a signal input of a CRT. For displaying a row of characters, for example, eight CRT lines are required; the information of the shift register 34 is fed back an equal number of times via the gates 31 and 32. During a spacing between two successive rows of characters, the information of module 28 is applied, via the gates 30 and 32, to the shift register 34. The modules 26, 27, 28 can operate at a speed lower than that of the shift register 34, so that a plurality of spacing lines, for example, eight, must be displayed while the information is being derived from a module. During the display of spacing lines, the gate 30 conducts, so that the output of the buffer store is connected to the input of the circulating store (34) for the time being. In order to obtain the correct adaptation, the shift register 34 receives a lower clock pulse frequency from the clock 35 during the spacing lines. During the display of television lines containing character information, the gate 31 is opened, while moreover the outputs of the modules 26, 27, 28 are connected to their inputs, although this is not separately shown. Two possibilities then exist. The first possibility is that during the display of a spacing the gate 23 is also open. In that case the circuit shown is suitable for displaying three rows of characters, each time the complete information contents then being present in the modules 26, 27, 28; when a spacing is displayed, the information of a row of characters is each time shifted over one module. At the beginning of the display of a television frame, the information is each time present in the starting position. During the display of a television frame, the information in the modules 26, 27, 28 can circulate once or an integer number of times.

A second possibility consists in that the input of the logic AND-gate 23 is not connected to the output of the module 28 but rather to the terminal 37. A circuit having its output connected to its input and an overall capacity of four lines of text is thus obtained. For the remainder the same as above is applicable. The assembly is always controlled by the control unit 29 which starts and controls the clock 35 and which opens the gates 22, 23, 30, 31, via the inverters 25, 33 or not, the flyback time between successive television lines and between successive scans of the entire image frame being taken into account in a suitable manner. New information can be inserted via terminal 21. This character information can always consist of, for example, 6 bits; these 6 bits can be serially processed in the gates and the storage modules. On the other hand, the information can always be processed in parallel. In that case the gates, input lines and the like must be of a six-fold construction.

Figure 3:
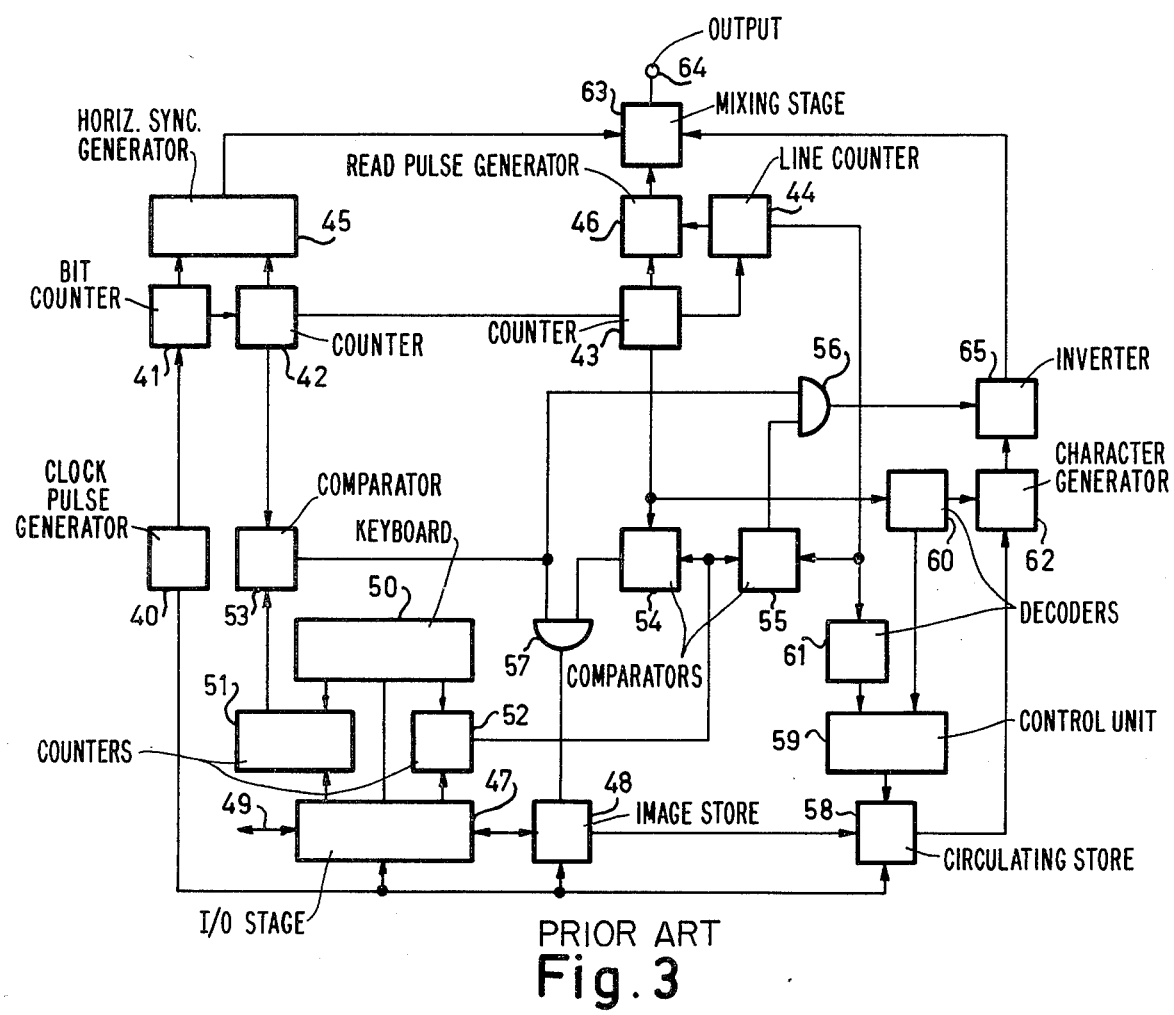
FIG. 3 shows a block diagram of a prior art cursor device.

FIG. 3 shows a block diagram of an x, y cursor device, together with other components of a display device according to the said present state of the art. The central clock pulse generator 40 controls the storage modules and drives a counter network consisting of the bit counter 41 which counts the number of bits per character, the character counter 42 which counts the number of characters per line, a line counter 43 which counts the number of television lines for a line of characters (including the spacing), and a line counter 44 which counts the number of lines per television image. These counters are decoded; in the stage 45 the horizontal synchronization pulses are generated, the vertical synchronization and the read pulses being generated in stage 46. Characters can be applied to the buffer store 48 via the input/output stage 47, via the communication line 49 via the keyboard 50. The storage location whose data is to be displayed is marked on the display screen by the cursor, which can be selected by means of the keyboard 50 or by the computer connected to the communication line 49 via the input/output stage 47 by means of two counters, the horizontal cursor counter 51 and the vertical cursor counter 52. Each counter position is compared, via the comparison circuits 53, 54, 55, with the positions of the counters 42, 43, 44. The cursor is displayed on the screen when the positions of the cursor counters 51 and 52 are the same as the positions of the counters 42 and 44, respectively, which is indicated by the comparison devices 53 and 55, respectively; the outputs thereof are connected by the logic AND-gate 56. The gate 56 supplies a signal when the electron beam passes the location on the screen corresponding to the positions of the counters 51 and 52. The comparison circuits 53 and 54 compare the positions of the elements 42 and 51 and 43 and 52, respectively, their output signals being combined by the logic AND-gate 57, the latter gate controlling the input of data into the image store 48 by the key-board or the computer. This is possible since the character counter 42 circulates synchronously with the storage modules when the number of lines of text per television image equals the number of television lines per line of text, or is two or four times as large.

The line-wise transfer of the stored information from the buffer store 48 to the circulating store for one line 58 is controlled by the control unit 59. This is effected in accordance with the positions of the counters 43, 44, which are decoded by the decoders 60 and 61. The information circulating in the circulating store 58 is applied to the character generator 62. Moreover, from the decoder 60 the character generator 62 receives the information as regards which television line of the line of text is to be displayed, and supplies an image signal which corresponds to the dot grid of the character to be displayed, the said image signal being mixed in the mixing stage 63 with the synchronization and read signals from the said stages 45 and 46. The output signal appears on terminal 64 and is applied to the signal input of a television monitor not shown. The display of the cursor information can be suitably effected in that the stage 65 inverts the image signal for the period during which the electron beam passes the location to be marked.

Figure 4:
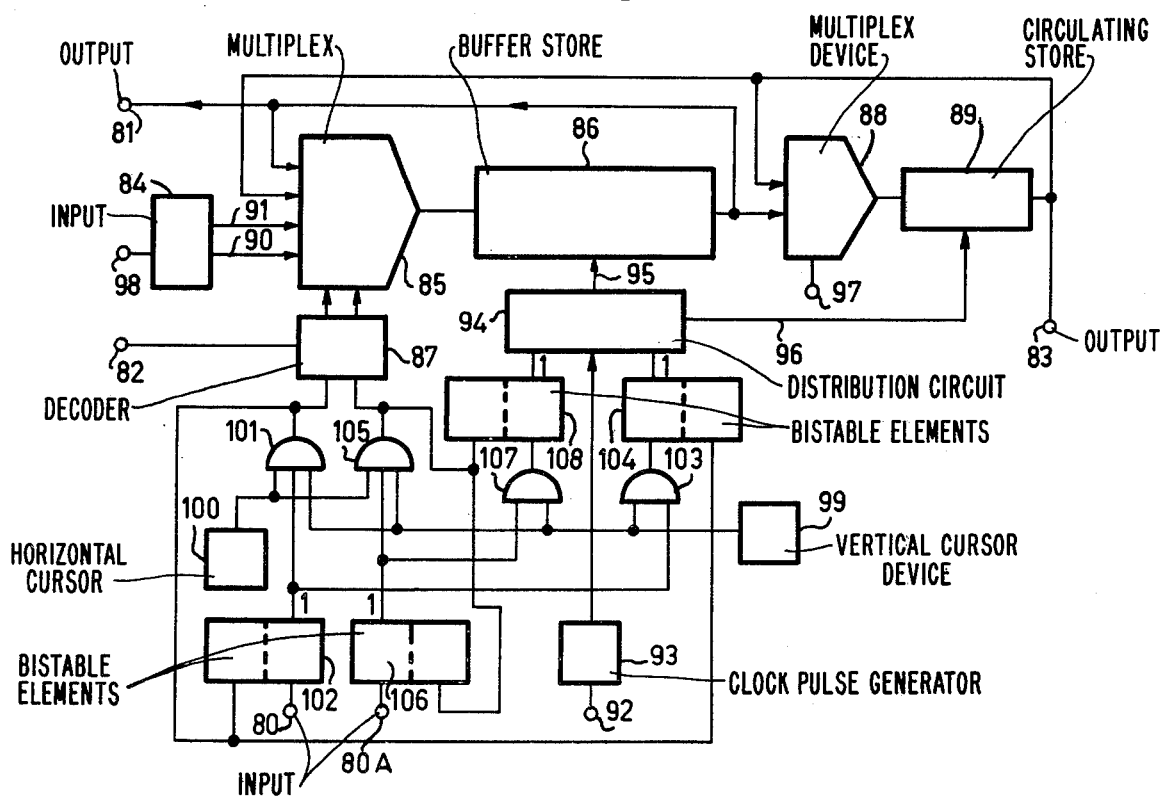
FIG. 4 shows a block diagram of a device according to the present invention.

FIG. 4 shows a block diagram of a device according to the invention. The device comprises control input terminals 80, 80A, 82, an information output terminal 81, a signal output terminal 83, an input device 84, a multiplex device 85, a buffer store 86, a decoder 87, a multiplex device 88, a circulating store 89, a spacing information input line 90, a character information transport line 91, a clock control input 92, a clock pulse generator 93, a distribution circuit 94, a clock pulse line 95, a clock pulse line 96, a control input 97, an information input 98, a vertical cursor device 99, a horizontal cursor device 100, logic AND-gates 101, 103, 105, 107, and bistable elements 102, 104, 106, 108.

The buffer store 86 can store the information of all lines of characters to be displayed. An output thereof is connected, via multiplex device 88, to the input of circulating store 89. The output thereof is connected, possibly via a character generator and other devices such as amplifiers, to a television monitor (not shown) for displaying the information, to the second input of the multiplex device 88, and to an input of the multiplex device 85. The clock pulse generator 93 is controlled by signals on terminal 92. The output of the buffer store 86 is furthermore connected to an input of the multiplex device 85 and to the output terminal 81. On the line 91 character information can be transported, via the input device 84, to the multiplex device 85, space information being transportable via the line 90. When a television line containing character information is displayed, the multiplex units 85, 88 are controlled by signals on the inputs 82, 97 such that the outputs of the stores are connected to their inputs. To this end, the multiplex device 85 receives a two-bit signal from the decoder 87, the multiplex device 88 receiving a one-bit signal via the control input 97. Via the distribution circuit 94, the clock pulse generator 93 applies clock pulses, via the lines 95 and 96, to the buffer store 86 and the circulating store 89, respectively, which are both constructed as a shift register. As has already been described, the buffer store can sometimes be operated at a lower speed; for the time being it will be assumed that this is not the case. During the display of a spacing line, the multiplex device 88 receives a signal via the control terminal 97, whereby the information of a line of characters is transferred to the circulating store, while in the buffer store 86 the information is fed back and returned to the input via the multiplexer 85, and it is also shifted over one line. The relevant control information is applied to the decoder 87 via the terminal 82. The vertical cursor device 99 and the horizontal cursor device 100 apply signals, like in the circuit shown in FIG. 3, to an element (not shown) which is connected to the output of the circulating store 83 and which corresponds to element 65 of FIG. 3, whereby the specific cursor information is displayed. Thus far the operation of the circuit corresponds to previous Figures.

The circuit is capable of performing two further operations, i.e.:
(a) the addition of a character ("insert")
(b) the removal of a character, each time in the location indicated by the specific cursor information ("delete"). When a character is inserted, the relevant information is applied to the input device 84 via the input 98. It is also assumed that the television lines are scanned in the normal reading direction, i.e., for Latin writing from left to right etc.

The signal "insert character" appears on terminal 80 in the form of a pulse which sets the bistable element 102 to the "1"-position. This signal can be derived, for example, directly from the depression of a character key of a keyboard. The character can also concern a spacing character. Under the control of the "1"-position and the correspondence signal of the vertical cursor device 99, the bistable element 104 is set to the "1"-position via the logic AND-gate 103. Under the control of this position, one or more clock pulses are witheld from the circulating store 89, with the result that the information therein "lags" by a character position. This can be suitably effected at the beginning of the display of a number of spacing lines between two lines, so that on the one hand the display is not influenced and on the other hand the transfer of the information from the buffer store is effected in a normal manner.

Under the control of the output signal of the bistable element 102 and the correspondence signal from the vertical cursor device 99 as well as the horizontal cursor device 100, the decoder 87 is driven via the logic AND-gate 101 as follows: for one character period line 91 is interconnected to the buffer store 86; starting with the next character period, the output of the circulating store 89 is connected to its input via the multiplex device 85, so that the characters thus shifted are stored in the buffer store. Moreover, possibly after a small delay, the bistable elements 102, 104 are reset to the "0"-position. At the end of the spacing, the applied character and also the already stored characters have been stored in the buffer store 86 in the correct location for display.

When a character is to be deleted, a control pulse appears on the terminal 80A which sets the bistable element 106 to the "1"-position. Under the control of this "1"-position and the correspondence signal of the vertical cursor device 99, the bistable element 108 is set to the "1"-position via the logic AND-gate 107. Under the control of this position, the distribution circuit 94 supplies the circulating store 89 with one or more additional clock pulses, with the result that the information therein "leads" by one or more characters. This can again be suitably effected at the beginning of the display of a number of spacing lines.

Under the control of the output signal of the bistable element 106 and the correspondence signal of the vertical cursor device 99 as well as the horizontal cursor device 100, via the logic AND-gate 105, the decoder 87 is driven such that it couples directly the output of the circulating store 89 to the input thereof via the multiplex device 85, so that the characters thus shifted are stored in the buffer store 86. Moreover, possibly after a small delay, the bistable elements 106, 108 reset to the "0"-position. At the end of the spacing the multiplex device 85 is switched over to the line 90 for one character period, so that the additional location is filled by a "spacing character". The remaining characters have then been stored in the buffer store 86 in the correct location.

The idea of the invention can alternatively be realized in a different manner. For example, in a single control cycle a plurality of characters can be inserted or deleted. Using the same device, it is also possible to perform further operations such as: replace a character by a spacing; this means that the circulating store 89 maintains the normal cycle, but the multiplex device 85 interconnects the spacing information line 90 and the buffer store during the relevant character period. Furthermore, the output of the buffer store 86 can be connected in known manner to inputs of a plurality of circulating stores, each having an output being intended for connection to a television monitor. In the described example, the clock pulse sequence to the circulating store was changed. Similarly, the clock pulse series to the buffer store can be influenced so as to impart a relative shift to the information. In given cases it is not necessary for the buffer store 86 to have a capacity which is adequate to contain the information of all lines of characters: a requirement then exists in that the combined capacity of the buffer store and the circulating store is adequate.

I claim:

1. A device for displaying a plurality of rows of characters and spacing lines on a display comprising:
   input means for supplying character information to be displayed;
   a buffer store having an input connected to said input means for storing character information corresponding to a plurality of rows of characters to be displayed and an output connected to said input of said buffer store, said buffer store having a capacity for accommodating all characters to be displayed together;
   a circulating row store for storing character information corresponding to a row of characters to be displayed, said row store circulating synchronously with the scanning of a line of a row of characters to be displayed, said row store having an input connected to said output of said buffer store;

and an output for connection to said display and to said input of said buffer store;

means for transferring said character information corresponding to a row of characters to be displayed from said buffer store to said circulating store during the display of at least one spacing line on said display;

clock pulse distribution means having respective clock pulse lines connected to said circulating row store and to said buffer store for providing a clock pulse sequence thereto;

control means, including an insertion and deletion signal input, connected to said clock pulse distribution means for producing a modified clock pulse sequence for controlling a relative shift of the characters stored in said buffer store with respect to characters stored in said circulating row store by at least one character position so as to produce a relative shift in the output of said circulating row store for allowing the insertion or deletion of a character in said buffer store; and x y cursor means connected to said control means for selectively activating said input of said buffer store for allowing passage of a predetermined row portion to said buffer store, shifted at least one character position with respect to said character information in said buffer store under the control of said modified clock pulse sequence for said circulating store.

2. A device as defined in claim 1, further comprising first multiplex means having a first input connected to said input means, a second input connected to said output of said buffer store; a third input connected to said output of said circulating row store; and an output connected to said input of said buffer store.

3. A device as defined in claim 2, further comprising second multiplex means having a first input connected to said output of said buffer store, a second input connected to said output of said circulating row store; and an output connected to said input of said circulating row store.

4. A device as defined in claim 1, wherein said buffer store is a shift register.

* * * * *